Patented Nov. 6, 1928.

1,690,913

UNITED STATES PATENT OFFICE.

OSKAR UNGER, OF LUDWIGSHAFEN-ON-THE-RHINE, AND GEORG BÖHNER, OF FRIED-RICHSFELD, GERMANY, ASSIGNORS TO GRASSELLI DYESTUFF CORPORATION, OF NEW YORK, N. Y., A CORPORATION OF DELAWARE.

MANUFACTURE OF VAT DYESTUFFS OF THE ANTHRAQUINONE-ACRIDONE SERIES.

No Drawing. Application filed October 25, 1926, Serial No. 144,169, and in Germany October 29, 1925.

It has been disclosed in the German Patent No. 237,236 that vat dyestuffs of the anthraquinone series can be prepared from 1-nitro- or 1-chlor-anthraquinone-2-carboxylic acid. According to the said process the acids are first converted into 1-arylamino-anthraquinone-2-carboxylic acids; in a second stage these acids, either directly or after being converted for example into acid halogenids, are converted into acridone derivatives by treatment with condensing agents. The German Patents Nos. 237,237 and 248,170 describe modifications of this two-stage process for the production of vat dyestuffs (see also U. S. Patents 1,002,066 and 1,011,068).

We have now found that the condensation of 1-cholor-antraquinone-2-carboxylic acids with arylamines and the conversion of the resulting 1-arylamino-anthraquinone-2-carboxylic acids into the acridones can be carried out in a single stage, so that the valuable acridones can be prepared in a much more advantageous manner than was hitherto possible.

According to our invention the initial materials, i e. the 1-cholor-anthraquinone-2-carboxylic acid and the aryl-amine, are heated in an inert organic solvent until the formation of the dyestuff has taken place. It is not necessary to carry out the operation in the presence of condensing agents or catalytically acting materials, but it is often advantageous to employ such substances, as in their presence the reaction proceeds more rapidly and with better yields.

Most advantageously, mild condensing agents especially such of an acid nature, are employed. As examples we mention borax, potassium bisulfate, oxalic acid, boric acid, arsenious acid, antimonious acid and the like.

The following examples will further illustrate how the present invention may be carried out in practice, but the invention is not limited to these examples. The parts are by weight.

Example 1.

300 parts of nitrobenzene, 28.6 parts of 1-chlor-anthraquinone-2-carboxylic acid and 17.2 parts of beta-naphthylamine are boiled under a reflux cooler until the formation of the dyestuff is finished. The mass is then allowed to cool, whereupon the separated crystals are filtered off by suction and freed from solvent in the usual manner. The product so obtained is identical with that described in the U. S. Patent No. 1,011,068, and corresponds to the formula:

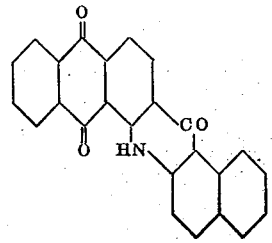

Example 2.

300 parts of napthalene, 28.6 parts of 1-chlor-anthraquinone-2-carboxylic acid, 15 parts of oxalic acid and 17.2 parts of beta-naphthylamine are treated as described in Example 1. The product is allowed to cool and freed from naphthalene by treatment with an organic solvent, whereby the same dyestuff as described in the foregoing example is obtained in glossy, red leaflets.

Example 3.

300 parts of trichlorbenzene, 28.6 parts of 1-chlor-anthraquinone-2-carboxylic acid, 15.3 parts of para-chlor-aniline and 12.4 parts of boric acid are boiled under a reflux cooler until unaltered 1-chlor-anthaquinone-2-carboxylic acid is no longer present. The product is worked up as described in Example 1. The product, corresponding to the formula:

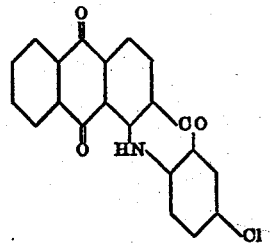

and the yield are the same as described in Example 3 of the German Patent No. 237,236.

Example 4.

300 parts of trichlorbenzene, 28.6 parts of 1-chlor-anthraquinone-2-carboxylic acid, 8.2 parts of anhydrous sodium acetate and 17.2 parts of beta-naphthylamine are boiled until acetatic acid is no longer evolved, whereupon 12.4 parts of boric acid are added and the mixture is further boiled until the formation of dyestuff is finished, and then allowed to cool. The dyestuff is filtered off by suction and is obtained in crystals identical to those obtained according to Example 1.

*Example 5.*

300 parts of trichlorbenzene, 28.6 parts of 1-chlor-anthraquinone-2-carboxylic acid, 24 parts of borax and 17.2 parts of beta-naphthylamine are boiled under a reflux cooler until unaltered 1-chlor-anthraquinone-2-carboxylic acid is no longer present. The product is worked up in the manner described above and is identical with that described in Example 1.

Instead of the condensing agents mentioned in the foregoing examples for example potassium bisulfate, phthalic acid, benzoic acid, arsenious acid and the like may be employed.

We claim:

1. The process of preparing vat dyestuffs of the anthraquinone series which consists in heating a 1-chlor-anthraquinone-2-carboxylic acid and an arylamine in an inert organic solvent until the formation of dyestuff has taken place.

2. The process of preparing vat dyestuffs of the anthraquinone series which consists in heating a 1-chlor-anthraquinone-2-carboxylic acid and an arylamine in an inert organic solvent in the presence of a weakly acid condensing agent until the formation of dyestuff has taken place.

3. The process of preparing a vat dyestuff of the anthraquinone series which consists in heating 1-chlor-anthraquinone-2-carboxylic acid with beta-naphthylamine in an inert organic solvent until the formation of dyestuff has taken place.

In testimony whereof we have hereunto set our hands.

OSKAR UNGER.
GEORG BÖHNER.